Nov. 1, 1927. 1,647,428
H. N. ATWOOD
MACHINE FOUNDATION
Filed Feb. 19, 1925
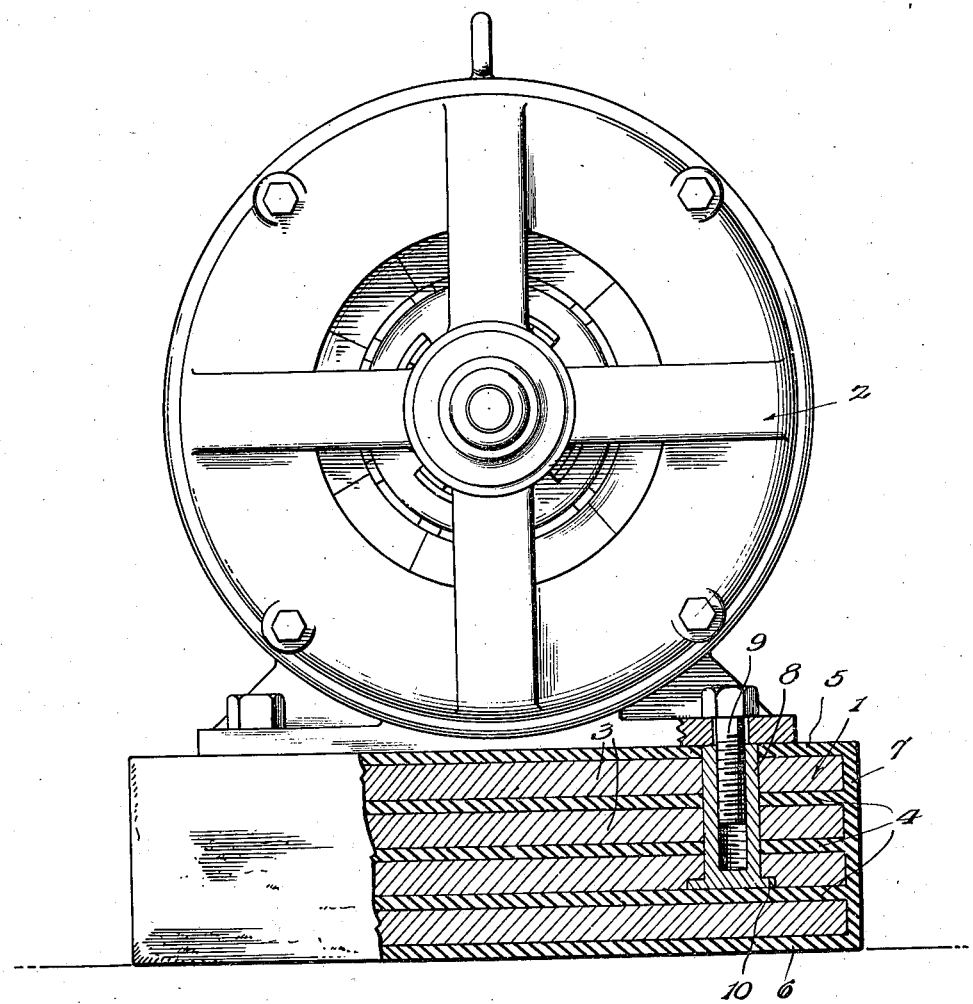
Inventor
Harry N. Atwood.
By Lacey & Lacey, Attorneys Patented Nov. 1, 1927.

1,647,428

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

MACHINE FOUNDATION.

Application filed February 19, 1925. Serial No. 10,435.

This invention relates to an improvement in the foundations or bases for machinery. Ordinarily electric motors and other machines are mounted upon a more or less solid base or foundation or are bolted directly to the floor of the building in which they are installed, or in the case of marine craft, aeroplanes, and the like, are mounted upon foundations which are more or less solid and are mounted or secured upon some part of the craft which is of a more or less unyielding nature. As a consequence the vibrations, created as a result of the operation of the machinery, are communicated to the structure upon or within which the machine is installed, and not only is annoyance caused through the noise created by the vibration of the machinery, but the vibration will in time have a disastrous effect on the structure within or upon which the machine is installed. Therefore, it is one of the objects of the present invention to provide a foundation for machinery which will absorb practically all of the vibrations which would otherwise be communicated to the structure within or upon which the machine is mounted, thereby overcoming the disadvantages which are ordinarily present where machinery is mounted upon a solid foundation.

More specifically, the invention has as its object to provide a foundation which will be more or less yieldable and possess cushioning qualities to a sufficient degree to insure of absorption of the vibrations from the machine mounted thereon.

Another object of the invention is to provide a foundation which may be mounted upon the floor of a building, in factories and the like, or installed in marine craft or air craft, and may be elsewhere employed as occasion may direct and will possess the properties above outlined.

The figure of the accompanying drawing is a view partly in elevation and partly in section of a machine foundation embodying the invention.

The foundation embodying the invention is indicated in the drawing by the numeral 1 and the machine which is supported thereon is indicated by the numeral 2. It will be understood of course that various types of machines may be supported upon the foundation, and the foundation may be made in dimensions adapting it to support the particular machine. In its simplest form, the foundation is of flat form and rectangular, circular, or of any other desired circumferential contour. The foundation comprises a plurality of plies 3 of veneer between which are interposed plies 4 of rubber, plies 5 and 6 likewise of soft rubber being arranged respectively upon the upper side of the uppermost veneer ply 3 and the lower side of the lowermost veneer ply, a ply 7 of soft rubber being arranged to extend about the circumferential surface of the assemblage so that the veneer plies are completely enclosed. After having assembled the various plies of veneer and soft vulcanizable rubber, the assemblage is subjected to a process of vulcanization whereby to effect intimate union of its component parts. In the process of vulcanization, the various rubber plies will, of course, become mutually united, and likewise the rubber will be caused to adhere to the veneer plies so that as a result, the finished foundation comprises, in effect, a body of soft rubber in which a plurality of plies of veneer are embedded. In order that the motor or other machine supported upon the foundation may be secured in place, various means may be employed, but it will generally be found satisfactory to embed in the foundation, at the time of manufacture, a tubular interiorly threaded bushing such as the bushing 8 shown in the drawing, and then secure the base of the machine in place upon the foundation by means of bolts 9 fitted through openings in the said machine base and threaded into the bushing. The bushings at their lower ends may be provided with circumferential flanges 10 rabbeted in the face of one of the plies 3 so that there will be no likelihood of the bushings being pulled out of place when the bolts are tightened.

From the foregoing description of the invention, it will be seen that there is provided a machine base or foundation which will effectually absorb vibrations and which therefore possesses marked advantages over the foundation structures which are of a solid and non-yielding nature. Likewise a machine supported upon a foundation constructed in accordance with the present invention will operate with greater efficiency and the journals and bearings and other moving parts of the machine will endure for a longer period of time due to the relatively complete absence of vibration.

Having thus described the invention, what is claimed as new is:

A machine foundation comprising a laminated body consisting of alternate plies of wood and rubber, the upper ply being rubber, said rubber plies being vulcanized into intimate engagement with the wooden plies, and anchoring members embedded in said body with their lower ends resting upon a rubber ply, said anchoring members extending upwardly through openings in certain of the plies with their upper end extending through the upper rubber ply.

In testimony whereof I affix my signature.

HARRY N. ATWOOD. [L. S.]